United States Patent [19]

Saito et al.

[11] 4,353,632
[45] Oct. 12, 1982

[54] ELECTROMAGNETICALLY DRIVEN SHUTTER DEVICE

[75] Inventors: Syuichiro Saito, Kawasaki; Masanori Uchidoi, Yokohama, both of Japan

[73] Assignee: Canon Kabushiki Kaisha, Tokyo, Japan

[21] Appl. No.: 221,632

[22] Filed: Dec. 31, 1980

[30] Foreign Application Priority Data

Jan. 8, 1980 [JP] Japan ................................ 55-499[U]

[51] Int. Cl.³ .......................... G03B 9/08; G03B 15/03
[52] U.S. Cl. .................................... 354/133; 354/147; 354/234
[58] Field of Search ............... 354/129, 133, 138, 140, 354/146, 147, 234, 235, 271, 34

[56] References Cited

U.S. PATENT DOCUMENTS

| 3,635,141 | 1/1972 | Starp et al. | 354/235 |
| 4,286,854 | 9/1981 | Seckendorf | 354/133 X |

*Primary Examiner*—L. T. Hix
*Assistant Examiner*—William B. Perkey
*Attorney, Agent, or Firm*—Toren, McGeady & Stanger

[57] ABSTRACT

In the disclosed device, an electromagnetic drive source in the form of a stator and rotor opens and closes shutter blades. A magnet sensor senses the displacement phase of the rotor, or any member operated by the rotor, to produce a timing signal at a predetermined position of the shutter during exposure. According to an embodiment of the invention, the timing signal is used for synchronizing a flash unit and the sensor is a reed switch.

5 Claims, 4 Drawing Figures

ELECTROMAGNETICALLY DRIVEN SHUTTER DEVICE

BACKGROUND OF THE INVENTION

This invention relates to electromagnetically driven shutters and, particularly, to a simple shutter arrangement capable of producing a timing signal during a predetermined phase of the exposure process.

Conventional camera shutters generally utilize springs or the like for driving the shutter blades. Recently, various types of electromagnetically driven shutters have been proposed to cut the manufacturing cost of the camera mechanism, to simplify it, and make it more compact. Such electromagnetically driven shutters also lighten the camera, but have the disadvantage of making it difficult to obtain a powerful enough driving force because of the compact, small capacity, battery which must normally be used with a camera. Consequently, where a synchronizing switch is needed to operate a flash, a problem arises. This is so because a conventional spring drive system is sufficiently strong so that the power lost in driving the synchronizing switch contacts is negligible. However, operation of synchronizing contacts with an electromagnetically driven shutter can interfere with the running of the shutter blades. The effect of the switch on the blades is too significant to be disregarded.

SUMMARY OF THE INVENTION

In view of the above problems, an object of the present invention is to offer an electromagnetically driven shutter by means of which a signal corresponding to the phase of the shutter exposure process is produced reliably without increasing any load to the driving source of the shutter.

Another object of the present invention is to offer an electromagnetically driven shutter by means of which a signal with high fidelity is produced at a predetermined phase of the shutter exposure process without relying upon the mechanical detecting method.

Further, another object of the present invention is to provide an electromagnetically driven shutter device by means of which a phase signal of the shutter exposure process is obtained with a remarkably simple additional member.

In accordance with the embodiment of the present invention a magnetic sensor is arranged in the neighborhood of the electromagnetic driving member in such a manner that the magnetic change due to the displacement of the rotor in the electromagnetic driving member is detected so as to obtain a signal at a certain determined phase during the shutter exposure process, so that the load on the shutter is barely increased at the time the shutter is driven. Consequently, even low power shutters can produce a timing signal, such as a synchronizing signal simply. Also, operation of a magnetic sensing member normally does not involve mechanical shock so that a high fidelity, stabilized, signal is obtained. Moreover the magnetic sensing member may be mounted at any one of a number of predetermined positions so that the construction of the device is substantially simplified.

DESCRIPTION OF THE PREFERRED EMBODIMENTS

An embodiment is explained below in detail in connection with the accompanying drawings.

Figure 1:
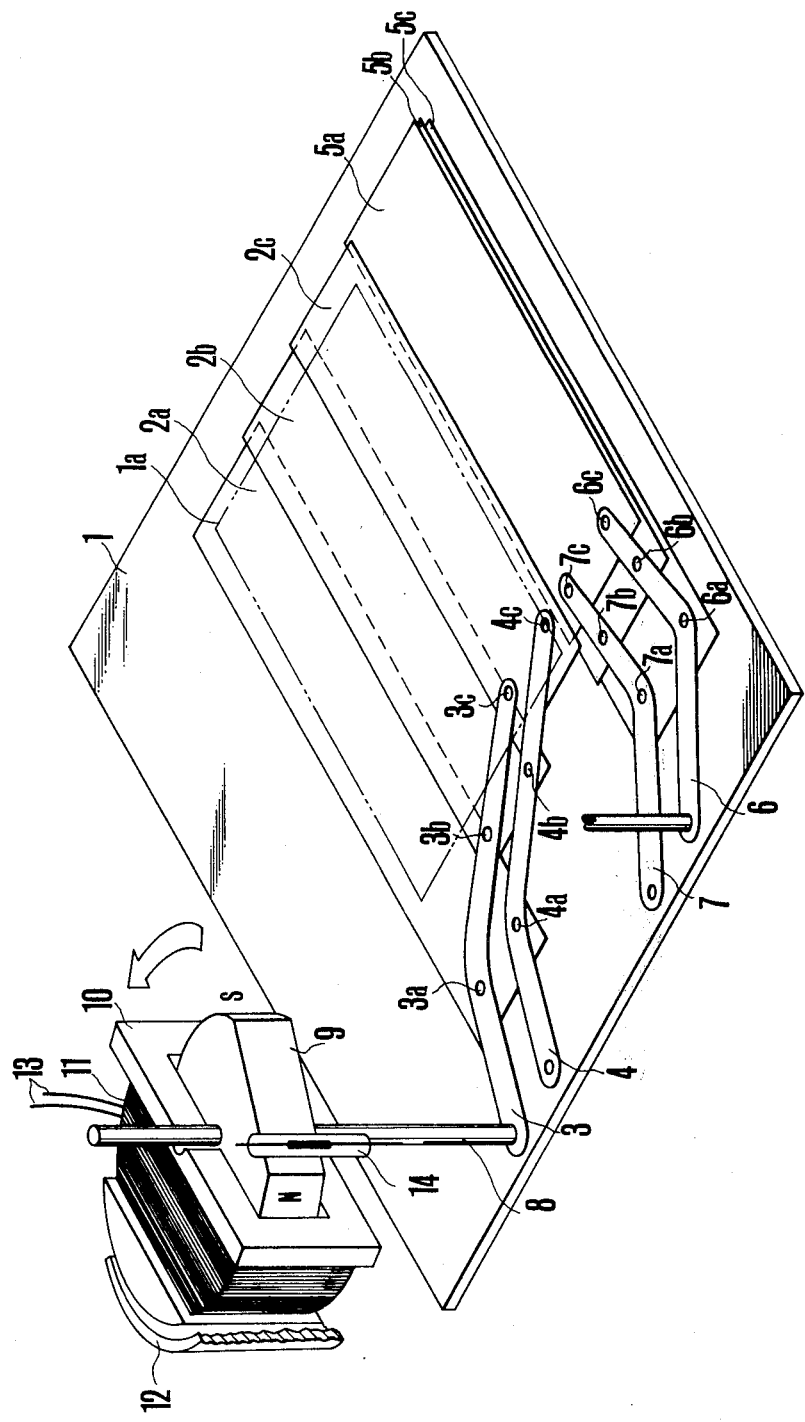
FIG. 1 is a perspective view of an electromagnetically driven shutter having a magnetic sensor and embodying features of the present invention.

FIG. 1 is a perspective view of an embodiment of a shutter having a movable magnet type electromagnetic driving source in which a reed relay is used as a magnetic sensing member. In the drawing, a shutter blase plate 1 forms an aperture 1a. Leading shutter blades 2a, 2b, and 2c are rotatably mounted on arms 3 and 4 by means of pins 3a, 3b, 3c, 4a, 4b, and 4c. The arms 3 and 4 are rotatably mounted on the base plate 1. The leading shutter blades 2a, 2b and 2c open and close the abovementioned aperture 1a by means of the link mechanism composed of the arms 3, 4, and pins 3a, 3b, 3c, 4a, 4b, and 4c. Rear shutter blades 5a, 5b, and 5c are mounted by a link mechanism composed of the arms 6, 7 and pins 6a, 6b, 6c, 7a, 7b and 7c in the same way as the leading shutter blades.

Figure 4:
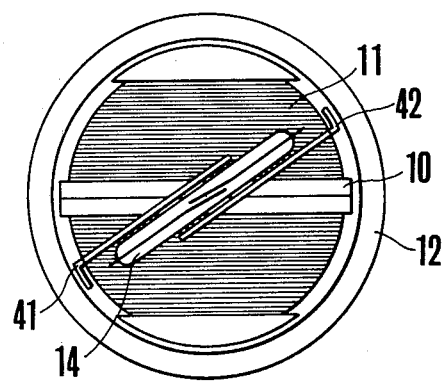
FIG. 4 is a plan view showing another embodiment of the present invention and, particularly, a mounting method of a relay forming the magnetic sensor.

A driving shaft 8, whose one end is fixed to the arm 3 and rotatably mounted on the base plate 1 is secured to a permanent magnet 9. The permanent magnet 9 is magnetized perpendicular to the driving shaft (diametrically). Member 10 is the semi-circular spool, on which a coil 11 is wound. In the drawing the spool 10 and the coil is shown only at the one side of the driving shaft, but as shown in FIG. 4, two semi-circular spools are used in combination.

A yoke 12 is in the form of a cylinder, only a part of which is shown.

Member 13 is a reed wire. A reed relay 14 serves as a magnetism sensing member in accordance with the present invention. The reed relay is arranged between the coil 11 and the yoke 12 in order to prevent magnetic influences from outside of the camera. Further, in the present embodiment the reed relay 14 is arranged at a position at which it is switched on in the phase of the rotor rotation corresponding to the totally opened state of the leading shutter blades 2a–2c.

Below, the operation of the device shown in FIG. 1 is as follows. FIG. 1 shows the cocked state of the shutter, wherein the magnetic pole of the permanent magnet 9 is spaced from the reed relay 14 so that the magnetic field at the position of the lead relay is weak and the reed relay is opened. When a current is supplied to the coil 11 for driving the leading shutter blades, the permanent magnet 9 is rotated by means of the electromagnetic force along the direction of the arrow in the drawing. In this way, the leading blades 2a, 2b and 2c open the aperture 1a. At the position at which the leading blades 2a, 2b and 2c totally opens the aperture the pole N of the permanent magnet 9 is nearest the reed relay 14, whereby the magnetic field at the position of the reed relay 14 becomes strongest so as to close the reed relay.

Figure 2:
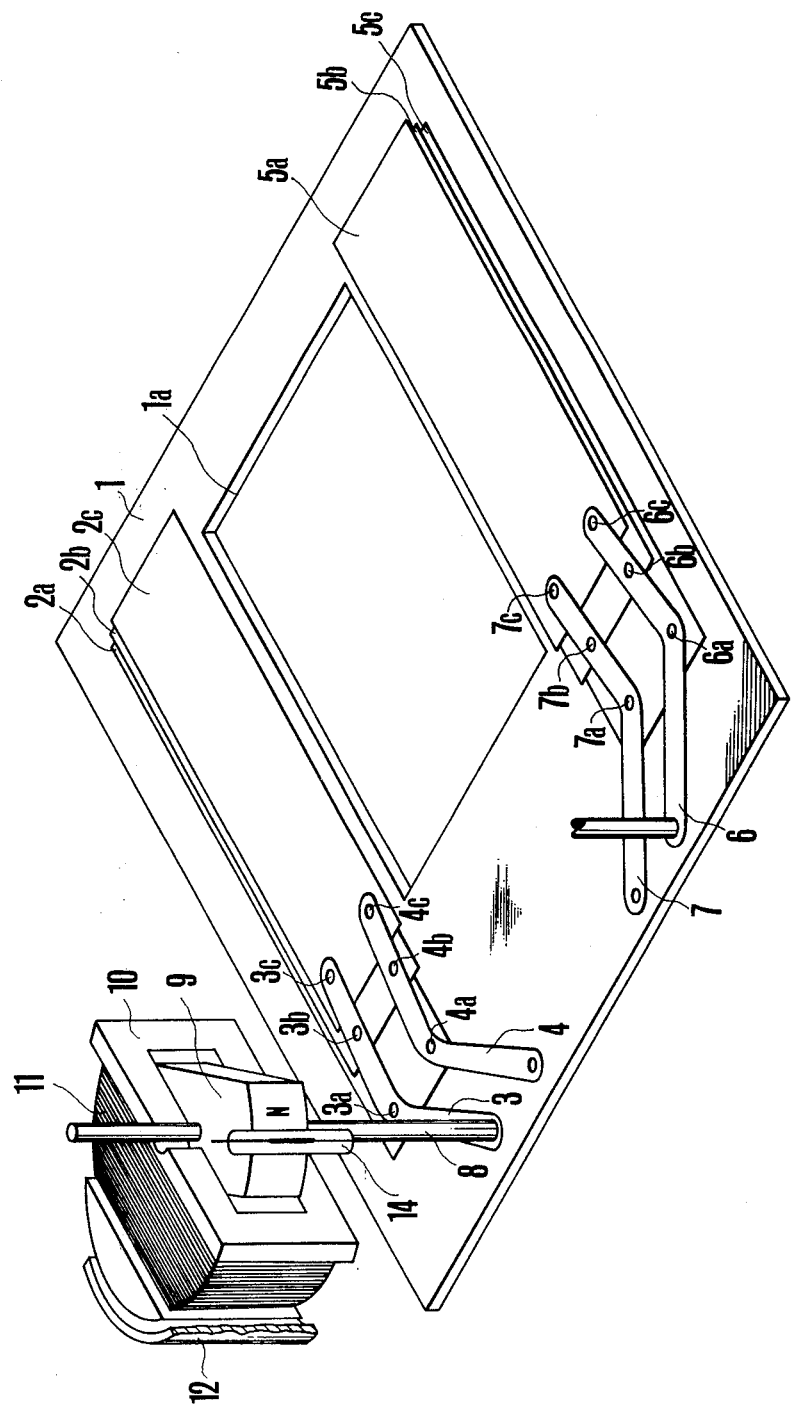
FIG. 2 is a perspective view of the embodiment shown in FIG. 1 with the shutter in its fully open state.

Further, a predetermined time after a current is supplied to the coil for driving the leading blades a current is supplied to the rear blades, which carry out the same operation as the leading blades so as to terminate the exposure. Further, in the drawing the electromagnetic device for driving the rear blades is omitted. FIG. 2 shows the device shown in FIG. 1, wherein the aperture 1a is totally opened, while the lead relay is switched on. Here, the members having the same reference characters as those in FIG. 1 are the same members.

Figure 3:
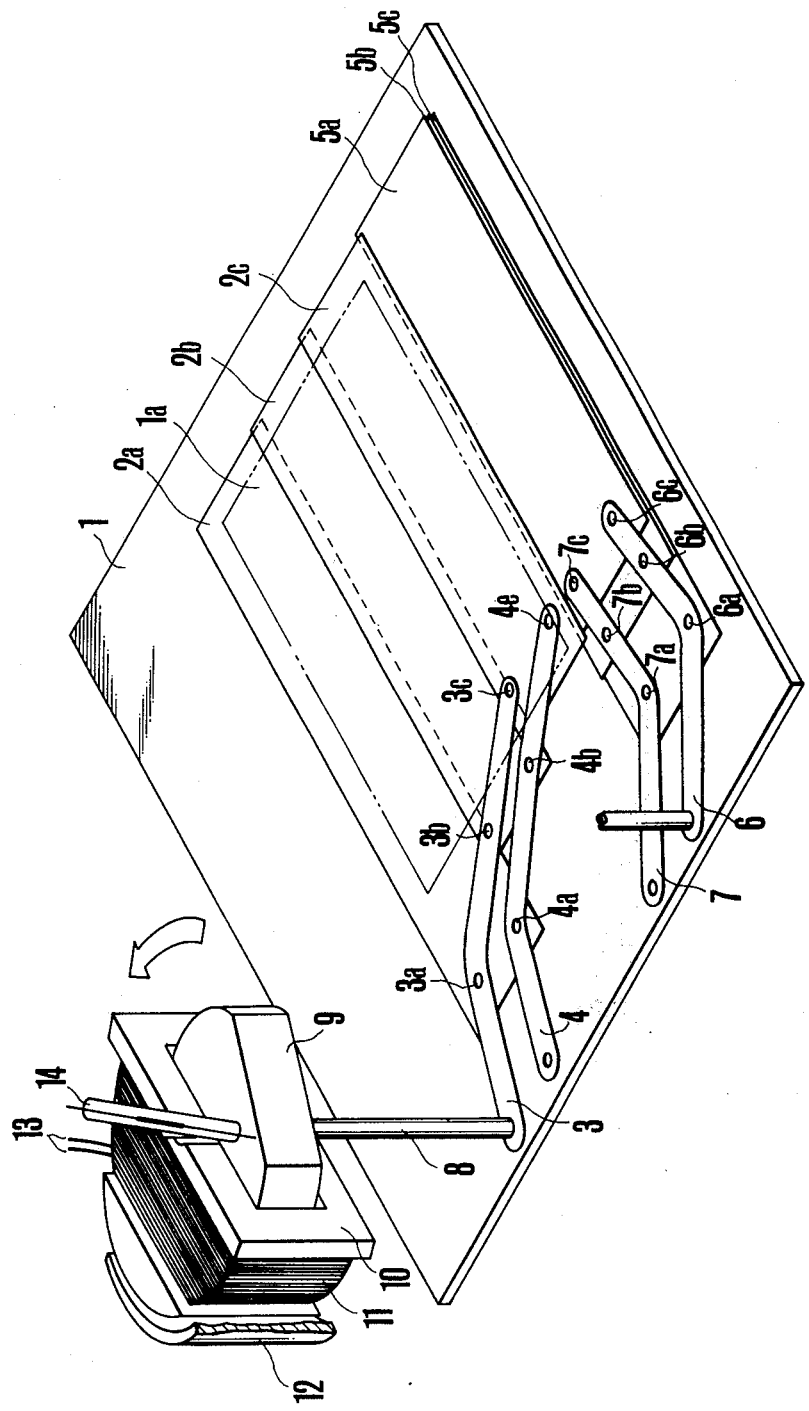
FIG. 3 is a perspective view of another embodiment of an electromagnetically driven shutter incorporating the present invention.

FIG. 3 shows another embodiment of the present invention in perspective view. Here, the members having the same reference characteristics as those in FIGS. 1 and 2 are the same members. In the drawing the reed relay 14 serving as the magnetic sensing member is set parallel to the plane in which the permanent magnet 9 is rotated so that the reed relay is closed when the magnetization direction of the permanent magnet 9 coincides with the direction of the reed relay.

FIG. 4 shows a plan view of another embodiment. In the drawing, 41 and 42 are yokes consisting of high permeability material. The one end of each yoke is positioned between the coil 11 and the yoke 12, while the other end is positioned on the side surface of the reed, relay 14. Consequently, when the pole of the permanent magnet 9 which rotates in the spool approaches the magnetic materials 41 and 42 between the coil 11 and the yoke 12 the magnetic flux acts upon the reed relay 14 through the magnetic materials 41 and 42 so as to close the reed relay 14.

FIG. 4 shows the reed relay provided above the coil. According to another embodiment, the reed relay 14 serving as the magnetic sensing member is located at other positions and the magnetic materials 41 and 42 lengthened.

So far the movable magnet type electromagnetic driving member has been explained. However, it goes without saying that the present invention can be applied also to the movable coil type electromagnetic driving member. Further, the magnetic sensing member is provided for the leading shutter blades, and it goes without saying that the member can be provided for the rear blades. Also, the magnetic sensing member is not limited to the reed relay, whereby anything, for example, Hall element, that can detect the magnetic change can do.

According to another embodiment of the invention, a thin piece of the permanent magnet is provided on the shutter blade itself, while the magnetism sensing member is positioned to magnetically sense this magnet piece. In the embodiments the signal is produced when the leading blades are totally opened, whereby this is nothing but an example of timing. Thus, it goes without saying that the signal may produced according to other timing.

According to an embodiment of the invention, the signal produced by the relay 14 is used as the synchronizing signal for operating a flash unit.

What is claimed is:
1. An electronically driven shutter comprising:
   at least one shutter blade for opening and closing an optical path by displacement of said blade;
   a permanent magnet member forming a magnetic field, a conductive member in the magnetic field of the permanent magnet, the one of the permanent magnet member and the conductive member being movable and connected to the shutter blade, the other member being fixed in the camera so that when a current is supplied to the conductive member along a predetermined direction an electromagnetic force operates between the permanent magnet member and the conductive member and displaces the movable one of the members so that the shutter blade opens and closes the photographic optical path at a given speed; and
   a magnetic sensor at a predetermined position relative to one of the members so as to detect the displacement position of the movable one of the members.
2. An electromagnetically driven shutter in accordance with claim 1, wherein the magnetic sensor being a reed relay.
3. An electromagnetically driven shutter in accordance with claim 1, wherein the magnetic sensor produces a signal when the shutter is totally opened.
4. An electromagnetically driven shutter in accordance with claim 1, wherein the signal produced by means of the magnetic sensor when the shutter is totally opened is used as the synchronization signal for flash photography.
5. An electromagnetically driven shutter in accordance with claim 1, wherein the magnetic sensing member includes a soft magnetic element for passing magnetic flux and a magnetic sensing element, the soft magnetic element is located at a predetermined position relative to one of the members so as to cause a change of magnetic flux in the magnetic sensing element when the movable one of the members is displaced to a predetermined displacement position.

* * * * *